(12) United States Patent
Francisco et al.

(10) Patent No.: US 8,199,654 B2
(45) Date of Patent: Jun. 12, 2012

(54) METHOD AND APPARATUS FOR PROVIDING END-TO-END HIGH QUALITY SERVICES BASED ON PERFORMANCE CHARACTERIZATIONS OF NETWORK CONDITIONS

(75) Inventors: David R. Francisco, Langhorne, PA (US); Madhav Moganti, Piscataway, NJ (US); Hanan M. Novotny, Aberdeen, NJ (US); Anish Sankalia, Iselin, NJ (US)

(73) Assignee: Alcatel Lucent, Paris (FR)

( * ) Notice: Subject to any disclaimer, the term of this patent is extended or adjusted under 35 U.S.C. 154(b) by 1512 days.

(21) Appl. No.: 11/157,570

(22) Filed: Jun. 21, 2005

(65) Prior Publication Data

US 2006/0285489 A1 Dec. 21, 2006

(51) Int. Cl.
*H04L 12/26* (2006.01)
*G06F 15/173* (2006.01)

(52) U.S. Cl. ........................................ 370/238; 709/224

(58) Field of Classification Search ................. 370/238, 370/229
See application file for complete search history.

(56) References Cited

U.S. PATENT DOCUMENTS

| | | | | |
|---|---|---|---|---|
| 6,553,515 | B1 * | 4/2003 | Gross et al. ..................... | 714/47 |
| 6,574,216 | B1 * | 6/2003 | Farris et al. .................... | 370/352 |
| 6,615,273 | B1 * | 9/2003 | Pan ............................... | 709/242 |
| 6,823,395 | B1 * | 11/2004 | Adolfsson ...................... | 709/242 |
| 7,606,887 | B1 * | 10/2009 | Stewart et al. ................. | 709/223 |
| 2001/0034853 | A1 * | 10/2001 | Takatama et al. .............. | 714/4 |
| 2002/0150041 | A1 * | 10/2002 | Reinshmidt et al. ........... | 370/216 |
| 2003/0086422 | A1 | 5/2003 | Klinker et al. | |
| 2003/0133443 | A1 * | 7/2003 | Klinker et al. ................. | 370/353 |
| 2003/0187991 | A1 * | 10/2003 | Lin et al. ........................ | 709/227 |
| 2004/0088404 | A1 * | 5/2004 | Aggarwal ....................... | 709/224 |
| 2004/0213201 | A1 * | 10/2004 | Osterlund ....................... | 370/351 |
| 2004/0258066 | A1 * | 12/2004 | Chen et al. ..................... | 370/390 |
| 2005/0185587 | A1 * | 8/2005 | Klinker ........................... | 370/237 |
| 2006/0002292 | A1 * | 1/2006 | Chang et al. ................... | 370/225 |
| 2006/0245350 | A1 * | 11/2006 | Shei et al. ...................... | 370/216 |
| 2008/0125106 | A1 | 5/2008 | Lee et al. | |

FOREIGN PATENT DOCUMENTS

| | | |
|---|---|---|
| JP | 2005508593 (A) | 3/2005 |
| WO | WO03/084159 | 10/2003 |
| WO | WO 03/084159 A1 | 10/2003 |
| WO | WO 2004/014062 A2 | 2/2004 |
| WO | WO 2004/040423 A2 | 5/2004 |

OTHER PUBLICATIONS

International Search Report in corresponding PCT/US2006/023080, Nov. 6, 2006, Lucent Technologies Inc.
May 6, 2011 Office Action in CN Patent Application No. 200680027477.2, Lucent Technologies Inc., Applicant, 8 pages.
May 17, 2011 Office Action in European Patent Application No. 06784851.5, Lucent Technologies Inc., Applicant, 6 pages.
Oct. 11, 2011 Office Action in JP Patent Application No. 2008-518224, Alcatel-Lucent USA Inc., Applicant, 2 pages.

* cited by examiner

*Primary Examiner* — Clemence Han
(74) *Attorney, Agent, or Firm* — Wall & Tong, LLP (57) ABSTRACT

A method and apparatus enforcing and improving end-to-end service quality, based on end-to-end service performance characterization of network conditions, for a convergence enabled end-user device during a user session for service. The methods and apparatus provide end-to-end network monitoring by implementing a performance monitoring agent in the end user convergence enabled end-user device, as well as in network elements providing and controlling a session communications path for the convergence enabled end-user device, such as base stations, wireline points of presence, data centers, network operations centers, among other network elements (e.g., nodes and facilities).

22 Claims, 6 Drawing Sheets

METHOD AND APPARATUS FOR PROVIDING END-TO-END HIGH QUALITY SERVICES BASED ON PERFORMANCE CHARACTERIZATIONS OF NETWORK CONDITIONS

FIELD OF INVENTION

The present invention relates to performance monitoring and service quality enhancements for convergence enabled end-user devices, and more specifically, to a method and apparatus for enforcing service level agreements to end users based on end-to-end service performance characterization of network conditions.

DESCRIPTION OF THE BACKGROUND ART

Users of convergence enabled end-user devices (e.g., cellular phones, smart phones, laptops, PDAs, WiFi/WiMax integrated phones/devices, among others) select service providers based on many factors, including costs, type of services provided, and quality of such services, user friendliness, among other considerations. Due to the rapid proliferation of the wireless and wireline internet using various access technologies such as CDMA, 3G1X, EVDO, WiMAX, WiFi, Cable/DSL, etc., it is becoming increasingly important for service providers to accurately measure the communication performance between two users, between user and the Application servers, and ensure high end-to-end IP data network performance. Service providers need to monitor various performance parameters that may be associated with network disruptions, such as latency/delays above permissible thresholds, high jitter, low power, high signal interference, packet loss, network congestion, node and link failures, down access links, poor quality access, routing costs that impact end-user service expectations, availability of alternative service providers perceived by the end-users as being better, among other network measurement criteria.

Further, mere monitoring of network conditions (e.g., congestion, packet loss, among others) does not provide any real-time corrective action across the network for an end-user suffering from poor or low quality network conditions. Moreover, there are currently no satisfactory real-time techniques to monitor end-to-end performance of the network, as well as provide real-time connectivity changes at the convergence enabled end-user device, nodes, links, and network facilities.

SUMMARY OF THE INVENTION

Various deficiencies of the prior art are addressed by a method and apparatus of enforcing, improving and providing always high service quality for a convergence enabled end-user device during a user session for service.

In one embodiment, a method of enforcing and improving service quality for a convergence enabled end-user device during a user session for service comprises: establishing the user session between the convergence enabled end-user device and a destination node via a first group of a plurality of network elements forming a network; measuring performance values associated with the session from real-time performance metrics received from the first group of network elements; and provisioning at least one network element of the first group in response to the measured performance values indicating degraded service quality for the session.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Service delivery suffers when supporting communications infrastructure performs poorly or fails, such as when unexpected spikes in the demand for services cause infrastructure node problems (server failures, data access disruptions). The methods and procedures and devices proposed in this invention address and prevent these potential service problems, thereby keeping their occurrence or associated disruptions to a minimum.

Specifically, the present invention provides a method and apparatus for providing session level optimization techniques to enhance services for a convergence enabled end-user device, such as a cellular phone, PDA, laptop, or any other convergence enabled end-user device utilizing wireless or wire line services to communicate information. In one embodiment, the methods and apparatus described herein provide end-to-end network monitoring by implementing a performance monitoring agent in the end user convergence enabled end-user device, as well as in network elements providing and controlling a session communications path for the convergence enabled end-user device, such as base stations, wireline points of presence, data centers, network operations centers, among other network elements (e.g., nodes and facilities).

In one embodiment, the performance monitoring agents implemented across the network (including the convergence enabled end-user device) monitor service quality with respect to the convergence enabled end-user devices current (real-time) session. Further, the performance monitoring agents are capable of determining alternative communications techniques to improve service quality for the ongoing session by the convergence enabled end-user device. Moreover, the performance monitoring agents are capable of implementing a real-time switchover between network elements (e.g., new communications path) to automatically provide improved service quality in real-time, and without having to reinitiate the session. That is, the present invention enables the quality of the session for end user services to be improved and enforced dynamically, on-the-fly.

In a second embodiment, a performance monitoring agent is also utilized in conjunction with an intelligent agent. The intelligent performance monitoring agent consists of the ability (via software implementation) to learn from previous network events and measured characteristics, and is able to provide optimal network services (e.g., a communications path) to the end-users. In one embodiment, the intelligent agent and performance monitoring agent collectively determine the optimal network services based on the past acquired knowledge/learnings (history) and current network conditions. In a second embodiment, the intelligent agent also utilizes heuristics to predict optimal network services to provide an end user session, based on previous network conditions stored in one or more knowledge bases. Knowledge base(s) store network performance data useful in adapting network routing/provisioning/reprovisioning decisions based on, for example, other factors such as least cost routing calculations. The knowledge base(s) are updated as new information becomes available.

For either of the embodiments, end-to-end network monitoring and performance enhancement may be provided by identifying past and present network conditions, and taking measured steps to avoid poor quality network conditions. That is, an intelligent performance monitoring agent implemented across the network (including the convergence enabled end-user device) can determine appropriate corrective action not only based on currently (real-time) measured network conditions, but also based on previous network conditions learned by the various network elements across the network.

Figure 1:
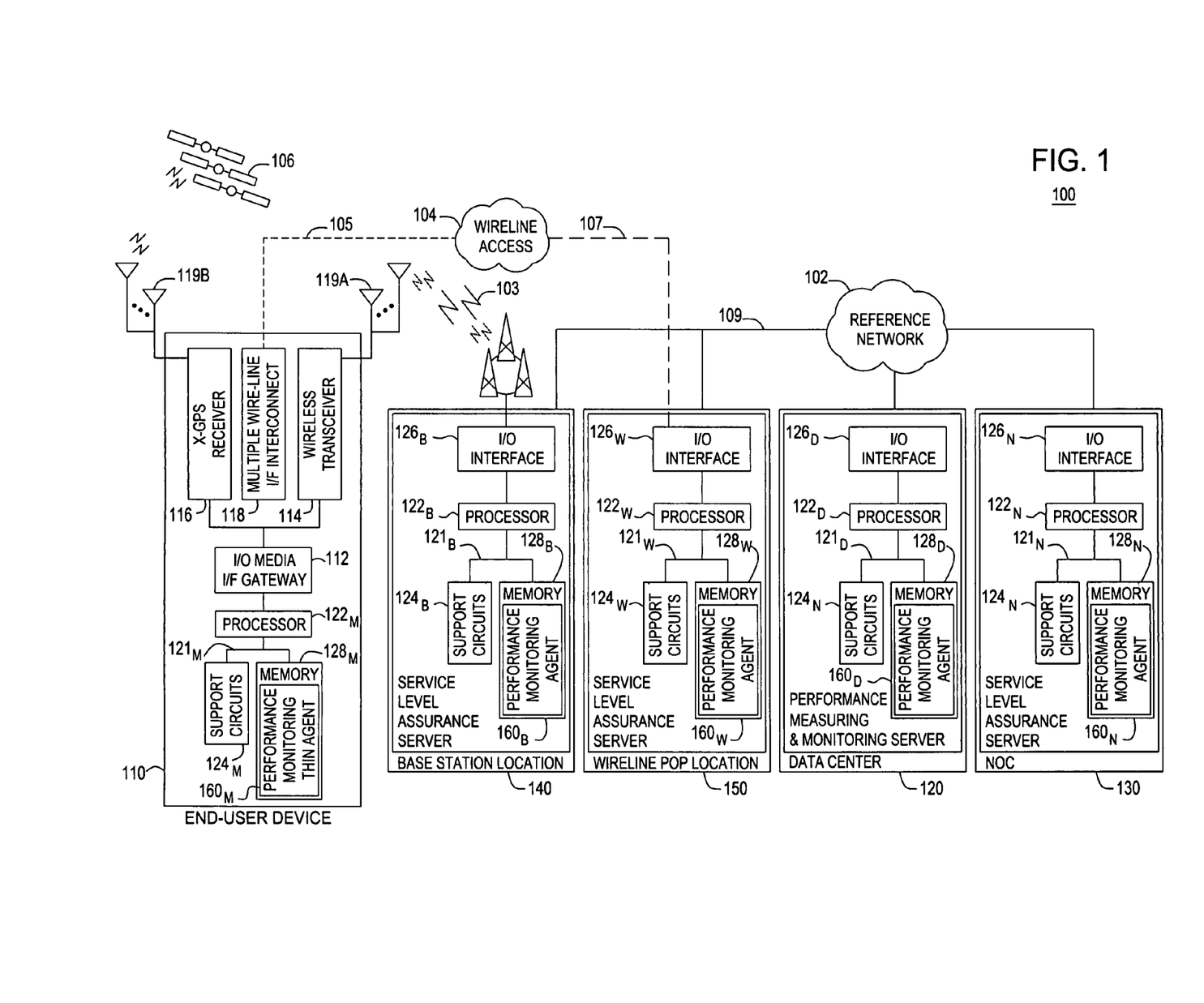
FIG. 1 depicts a high-level block diagram of an exemplary communications network suitable for implementing a performance monitoring agent of the present invention.

FIG. 1 depicts a high-level block diagram of an exemplary wireless network 100 suitable for implementing a performance monitoring agent 160 of the present invention. The network 100 comprises at least one convergence enabled end-user device 110, a reference network 102, a data center 120, a network operations center (NOC) 130, an optional base station 140, and an optional wireline point-of-presence (POP) 150. Although only a single convergence enabled end-user device 110, data center 120, NOC 130, base station 140, and wireline POP 150 are shown in the exemplary network 100, a person skilled in the art will appreciate that these exemplary network elements are shown for illustrative purposes, and the network 100 is not limited to a single convergence enabled end-user device, data center, NOC, base station, and wireline POP, and so forth.

Further, the base station 140 and wireline POP 150 are provided to illustrate various wireless communication mediums based on the type of convergence enabled end-user device 110 being used for session activity. The convergence enabled end-user device 110 may be a cellular device, a PDA, a laptop, or any other convergence enabled end-user device capable of wireless and/or wireline communications. For example, where the convergence enabled end-user device 110 is a cellular phone/PDA, wireless communications may be illustratively facilitated by base stations, each of which are associated a cell, as conventionally known in the art. Accordingly, wireless communications are provided between the cellular phone/PDA and base station, illustratively along path 103.

Alternatively, where the convergence enabled end-user device 110 has wireline capabilities, then a wireline POP is required to establish and maintain a user session. For example, where the convergence enabled end-user device is illustratively a laptop accessing a wireline access POP 150 (for example, a Cable head-end, or a DSL POP), wireline communications are facilitated via a wireline access node 104 (for example, Cable access or DSL access) associated with each wireline POP location 150, as conventionally known in the art. It is noted that the wireline access network 104 may be a dial-up modem, a DSL or cable modem, an Ethernet connection to a wireless local area network (WLAN), among other types of conventionally known wireline networks suitable for exchanging information between the convergence enabled end-user device 110 and the wireline POP 150.

A reference network 102 illustratively provides a communications path between the data center 120, network operations center 130, the base stations 140, and wireline POPs 150. The reference network 102 may be a packet switched network such as the Internet, or an Intranet, or a public switched telephone network, among other networks.

FIG. 1 further depicts a high-level block diagram of the major components of the convergence enabled end-user device 110, the data center 120, the NOC 130, the base stations 140, and wireline POPs 150 suitable for use in the network 100 of FIG. 1. In one embodiment, convergence enabled end-user device 110, the data center 120, NOC 130, base station 140, and wireline POP 150 of FIG. 1 each comprises at least one processor 122, support circuitry 124, I/O circuitry 126, memory 128, and at least one bus 121 for exchanging information there between. For example, the convergence enabled end-user device, data center, NOC, base station, and wireline POP respectively include processor $122_M$, processor $122_D$, processor $122_N$, processor $122_B$, and processor $122_W$, where the letters M, D, N, B, and W are respectively associated with the convergence enabled end-user device, data center, NOC, base station, and wireline POP. The components shown and described with respect to FIG. 1 should not be considered as limiting, as one skilled in the art will appreciate that other components may be present to perform operations associated with each network element (e.g., node).

The at least one processor 122 may be any conventional processor for executing programs stored in memory 128. The memory 128 may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as data performance monitoring agent 160 of the present invention.

The processor 122 cooperates with conventional support circuitry 124, such as power supplies, clock circuits, cache memory and the like, as well as circuits that assist in executing the various programs and routines, such as methods 200, 300, 500, and 600 (see FIGS. 2, 3, 5, and 6), and other programs and data, which are executed by the performance monitoring agent 160. As such, it is contemplated that some of the process steps discussed herein as software processes may be implemented within hardware, for example, as circuitry that cooperates with the processor 122 to perform various steps. The input/output (I/O) circuitry 126 forms an interface between the various functional elements communicating with each network facility. For example, in the embodiment of FIG. 1, base station 140 utilizes its I/O circuitry $126_B$ to exchange information with the I/O circuitry $126_N$ of the NOC 150 via the reference network 102.

Although each network facility of FIG. 1 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

In the exemplary embodiment of FIG. 1, the convergence enabled end-user device 110 is illustratively shown as having global positioning system (GPS) 106 capabilities. In this embodiment, the convergence enabled end-user device 110 further comprises an I/O media interface (i/f) gateway 112, a wireless transceiver 118, a GPS receiver (e.g., an enhanced GPS receiver) 116, a multiple wireline i/f interconnect 118, and at least one antenna 119A for wireless access and at least one antenna 119B for GPS network access. The GPS receiver 116 receives global positioning information from satellites 106 in a conventional manner. Presently the GPS signals are mostly out of band, but in future GPS information will be in-band transmitted. The wireless transceiver 114 is used to exchange information through the base station 140. In one embodiment, where enhanced GPS service is utilized, the wireless transceiver 114 is used by the convergence enabled end-user device 110 to communicate with a position server (not shown) in the network 100 via the base station 140 to assist in computing the position of the convergence enabled end-user device 110, as conventionally known in the art. In another embodiment where the convergence enabled end-user device includes wireline capabilities, the multiple wireline i/f interconnect 118 provides the capability to exchange information over the wireline access network 104, as conventionally known in the art.

The performance monitoring agents (PMA) 160 include software programming that operates along with an operating system (OS) associated with a network node. Although not shown in FIG. 1, it is noted that a PMA 160 may be installed and utilized on each client, access node, core elements, as well as application servers and performance monitoring equipment (i.e., nodes) in the network 100. In other words, the network elements illustratively shown and described in FIG. 1 should not be considered as limiting elements facilitating the PMA 160 of the present invention.

In one embodiment, the PMA $160_M$ associated with the convergence enabled end-user device 110 is a thin agent that operates in conjunction with any OS that is loaded on the convergence enabled end-user device 110. This PAM $160_M$, for example, has a capability of sending alerts to the end-user based on the device capabilities the end user is using. Also, based on the device capabilities, the PAM $160_M$ requests for appropriate performance measurements from the other network nodes. Similarly, the PMAs 160 associated with the base stations 140, wireline POP 150, data center 120, and NOC 130 operate in conjunction with operating systems (e.g., Windows, LINUX, among others) associated with these network elements (e.g., nodes). Each PMA 160 may initiate any performance measurement activity locally or for any other network node having a PMA 160. The PMA 160 utilizes various algorithms to provide geographic information system (GIS) based distance calculations as required, throughput vs. actual throughput differences, designated link budget vs. actual link budget, actual BER vs. observed BER, desired path vs. actual best available path, among other network metrics.

The PMAs 160 include routines to monitor and store information related to various events, triggers, alarms, heartbeats, traps, air interface diagnostics, air interface interference parameters, handoff parameters, roaming parameters, as well as authorization, authentication, and security parameters. Further, the PMAs are able to monitor signaling, as well as bearer traffic alarms, events and messages to analyze any discrepancies and lost frames, packets, and application formats (i.e., layers 2-7 monitoring and collection of statistics).

Thus, the PMAs 160 at each network element are able to act in either server or client mode, and independently as a sender or receiver in an exclusive manner. Data may be sent with a GPS feed or may be pulled by an opposing node at a selected time, event, alarm, or via control messages.

In one embodiment, the PMAs 160 comprise a control portion and a test portion. The control portion includes routines that are used for session initiation, setup, tear-down, confirmation, and retrieval of results. The test portion includes routines and algorithms for monitoring, collecting, and measuring various network parameters to determine, for example, loss probability, median delay, jitter, 90th percentile of delay, and the like. Non-singleton characteristics, such as expected inter-arrival gap of packets that were sent back-to-back can also be measured, as well as recorded, played back and stored at various nodes, as required. Generally speaking, in various embodiments of the invention, one or more of at least the following performance values may be determined and/or utilized as discussed herein: Bit Error Rate (BER), signal-to-noise (S/N) ratio, power level, path congestion, latencies, network element utilization, network link utilization, jitter, network element reliability, service reliability, routing path taken and routing path cost.

Figure 2:
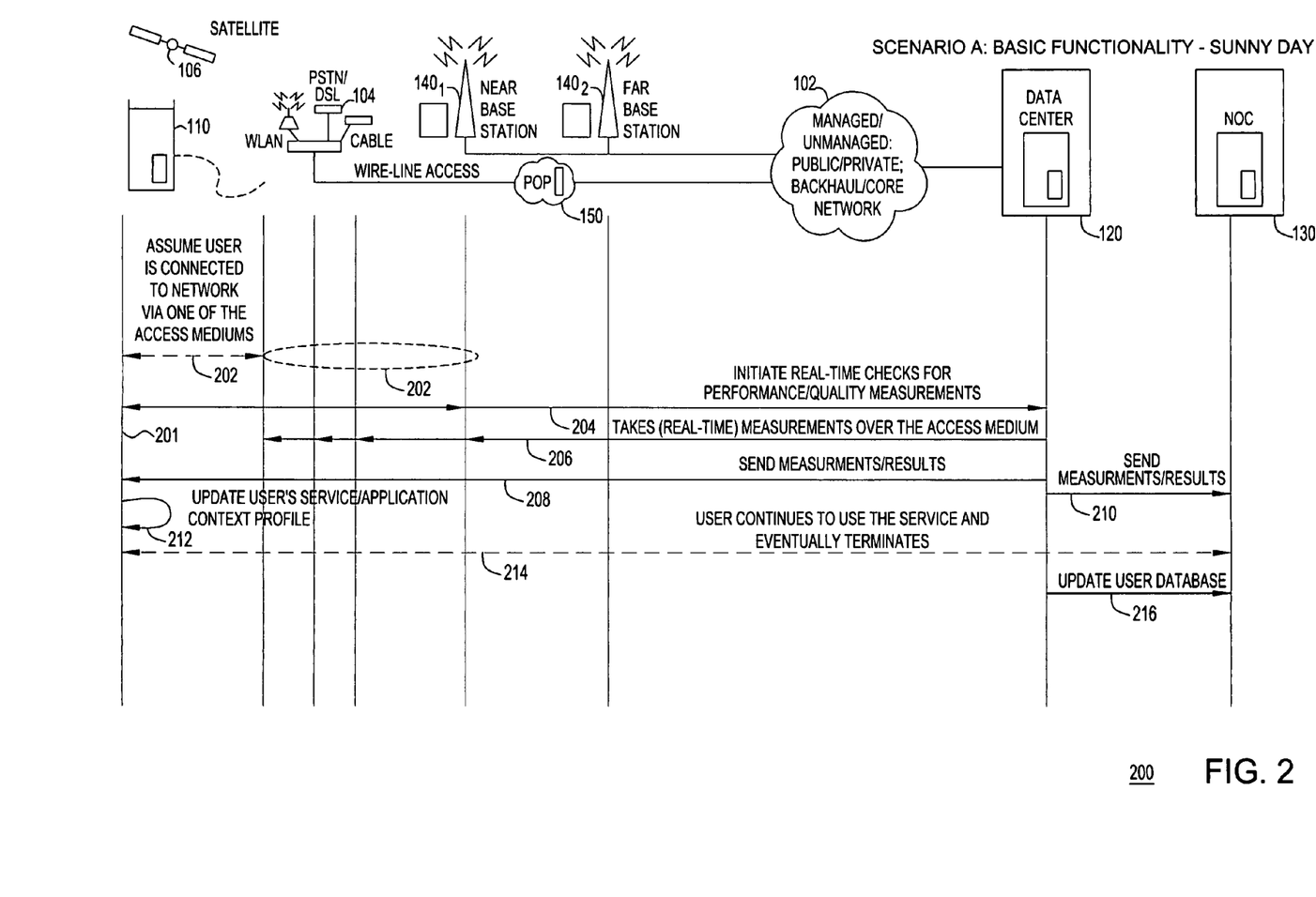
FIG. 2 depicts a flow diagram of a first method for monitoring network conditions suitable for use in the exemplary network of FIG. 1.

FIG. 2 depicts a flow diagram of a first method 200 for monitoring network conditions suitable for use in the exemplary network 100 of FIG. 1. The flow diagram illustratively shows communications and operations at various network elements. In particular, columns are provided, looking left to right, to illustrate operations and communications respectively occurring at the convergence enabled end-user device 110, the wireline access networks 104, POP locations (e.g., WLAN, PSTN/DSL, cable) 150, a near base station $140_1$, a distant base station $140_2$, the data center 120, and the NOC 130. As noted above, other nodes (e.g., core nodes, application servers, among other network elements) in the network 100 may also implement the PMA 160 of the present invention.

The method starts at step 201, where the user of the convergence enabled end-user device 110 initiates a session to receive a particular service. The session may be to place a telephone call using cellular or wireline access to another individual, a request for content (e.g., multimedia content and/or data) from a content provider, among other information available over the resource network 102. At step 202, the user connects to the network 100 via one of several possible access mediums. For example, the user may illustratively connect to an access network 104 such as a WLAN, PSTN, DSL, or cable access network, in an instance where a session across a wireline access medium is sought by the end user. Alternatively, the user may illustratively connect to an access network such as a nearby base station $140_1$, in an instance where cellular communications is sought by the end user. As shown in FIG. 2, the small dashed line and a large dashed (elliptical) line at step 202 represents connectivity to either wireline access network 104 or communication with the base station $140_1$. The method 200 then proceeds to step 204.

At step 204, real-time monitoring of performance and session quality is initiated at the various network elements being utilized to conduct the session. That is, various metrics are monitored at the elements by their respective PMA 160 and then sent to the data center 120 for processing. The network metrics may include timestamp information associated with packets passing there through, BER, power levels, signal strength, node/link failures, among other network metrics.

At step 206, the data center 120 computes real-time measurements over the access medium (i.e., the network elements used in the path to establish the session). As illustratively shown in FIG. 2, real time measurements are taken by the performance monitoring agent $160_D$ associated with the data center 120. That is, the data center 120 computes real-time measurements associated with each node (e.g., base station 140, wireline POP 104, core network elements 102, and mobile node 110) based on the metrics sent by these nodes. For example, if the session includes cellular communications, then the performance monitoring agent $160_D$ of the data center 120 computes real time performance/quality measurements associated with the near base station $140_1$, network 102, and the convergence enabled end-user device 110. Similarly, if the session includes wireline (e.g., cable) communications, then the performance monitoring agent $160_D$ of the data center 120 computes real time performance/quality measurements associated with the wireline POP 150, access network 104, and the convergence enabled end-user device 110.

The performance/quality measurements include determining signal-to-noise ratio (S/N), bit error rate (BER), signal power level, latencies, network element and service reliability, network element and link utilization, among other measurements. In one embodiment, the network nodes timestamp packets passing therethrough (incoming and/or outgoing packets), thereby enabling performance measurements to be collected across the network nodes and links. That is, explicit send and receive timestamps are provided for every measurement packet to measure latency/delays, and jitter. Moreover, the timestamps eliminate having to estimate roundtrip times and the ambiguity associated with prior art techniques, such as PING techniques.

At step 208, the measurements taken at the data center 120 are sent to the convergence enabled end-user device 110. Similarly, at step 210, the measurements taken at each node are also sent to the NOC 130. At step 212, the convergence enabled end-user device updates a service/application context profile (not shown) stored in memory $128_M$. The service/application context profile is used to store the latest real time measurements associated with the session. For example, data such as signal strength, send/receive power, S/N ratio, interference metrics, quality of service availability, class of service availability from that location, list of services the end user can use from that location, list of services the end user can simultaneously use from that location, cost of service from that location, packet loss, different delay metrics, throughput metrics, and the like among other measured metrics may be stored for future reference by the convergence enabled end-user device 110.

In particular, in an instance where the PMA $160_M$ determines that the service quality for the current session could be improved, the convergence enabled end-user device 110 utilizes the updated data stored in the service/application context profile to determine an appropriate switchover event, as discussed below in further detail with respect to FIG. 3. Further, the convergence enabled end-user device 110 provides notice to the end-user regarding the class of service and quality of service. The notice may include visual or audio indicators, such as graphical representations of particular metrics (e.g., bar graph of signal strength among other performance indicators). The measured performance/quality metrics are also sent and utilized by the other nodes (e.g., base station, wireline POP, among others) to evaluate the condition of the network and provide alternative solutions to improve the service quality for the current session.

At step 214, assuming the performance/quality of the current session is satisfactory, the convergence enabled end-user device 110 continues with the session until the user terminates such session. At step 216, the data center 120 updates a user session database at the NOC 130. The NOC 130 stores the updated user session information, which enables the service provider to provide up-to-date customer services, including appropriate billing based on the service quality the end user received. Once the session has been terminated and the data center 120 has sent the update information to the NOC 130, the method 200 ends. It is noted that once the session is established, each of the network elements continues to periodically monitor and measure performance/quality metrics during the course of the session. In the event of network degradation, the present invention provides alternatives to improve the service quality, on-the-fly, in real time, as illustratively shown in the method 300 of FIG. 3.

Figure 3:
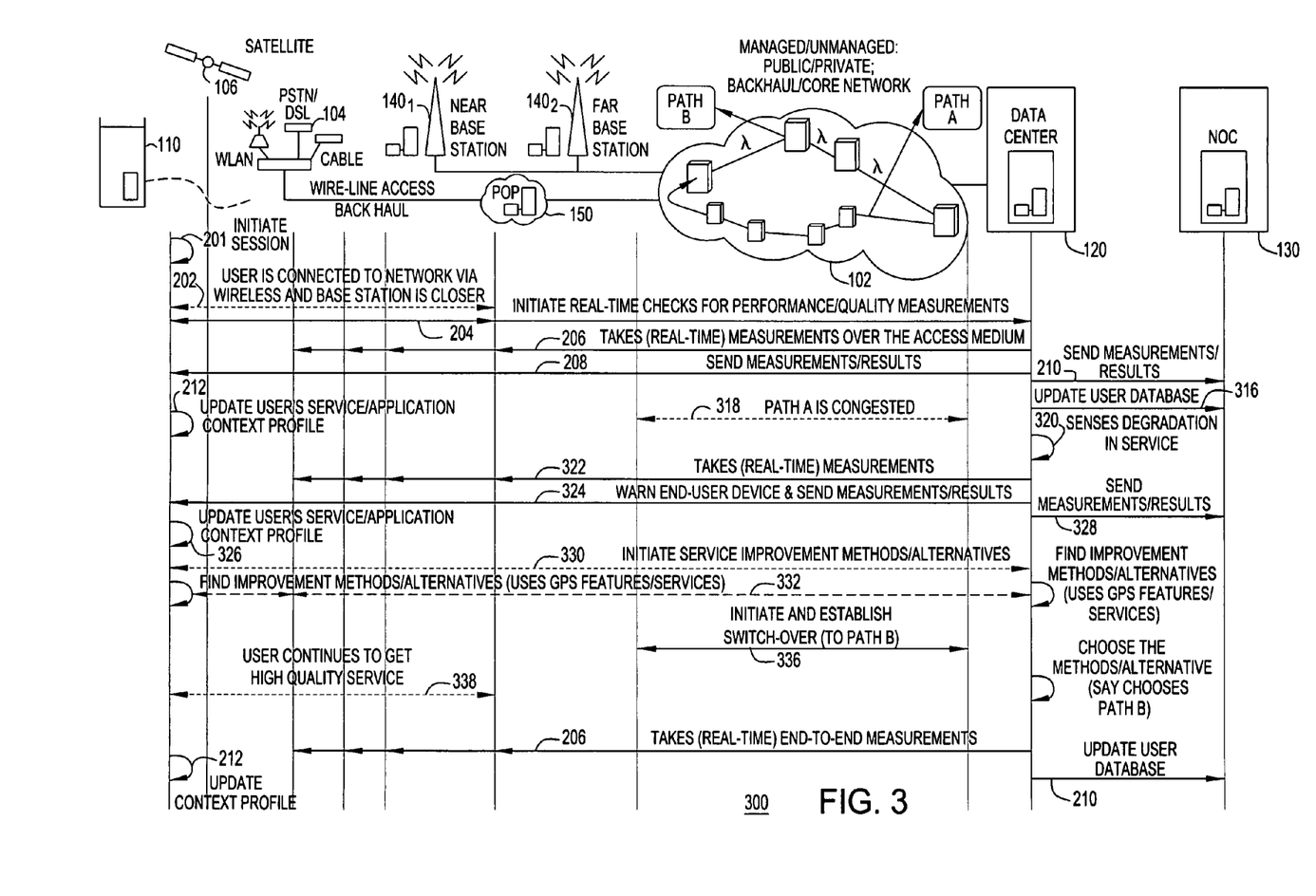
FIG. 3 depicts a flow diagram of a second method for monitoring network conditions suitable for use in the exemplary network of FIG. 1.

FIG. 3 depicts a flow diagram of a second method 300 for monitoring network conditions suitable for use in the exemplary network 100 of FIG. 1. The flow diagram of FIG. 3 is the same as the flow diagram shown in FIG. 2, except for the differences noted herein. Further, FIG. 3 is illustratively discussed in terms of a cellular session being established at the near base station $140_1$, however a person skilled in the art will appreciate that the principles discussed below are also applicable to a session initiated over a wireline access network 104.

Method 300 begins at step 201, where a user initiates a session for services, and continues through steps 202-210, as discussed above with respect to method 200 of FIG. 2. That is, the session is established and the user is able to utilize the network elements forming a communications path in the network 100 during the course of the session without any degradations.

Step 318 illustrates that degradation in network quality has occurred during the user's session. For example, and as illustratively shown in FIG. 3, the core network 102 illustratively shows two paths A and B, which are each formed by a plurality of routers/switches having links there between. As shown in the core network 102, for example the route shown as Path B is utilizing DWDM technology, hence the shown wavelengths (λ) along the path. Assume, for example, path A becomes congested at step 318. At step 320, the data center 120 performance management agent $160_D$ senses and detects the congestion on path A in the core network 102. It is noted that the data center 120 (and also the NOC 130) is provided with various monitoring equipment to detect network degradations at various network elements. For example, the data center 120 is able to detect network congestion, S/N ratios, power levels, packet delays and losses, among other metrics across the nodes and links of the network 100.

Once the degradation is detected, at step 322, the PMA $160_D$ at the data center 120 is utilized to compute real-time measurements from various real-time metrics received from the network elements. Specifically, the PMA $160_D$ compares the computed measurements to corresponding thresholds to determine the exten of degradation.

At step 324, the data center 120 notifies the convergence enabled end-user device of a degraded network condition. Such notification may include visual or audio indicators, such as text, graphical representations, sounds, among other user friendly indicators. Further, the measurements and results taken at step 322 are sent to the convergence enabled end-user device 110 and at step 326, the convergence enabled end-user device 110 updates the user's service/application context profile, as discussed above. Similarly, at step 328, the measurements and results are also sent to the NOC 130.

At step 330, the data center 120 and convergence enabled end-user device 110 initiate communications therebetween to find network service improvements based on the measurements and results taken by the data center 120. At step 332, the convergence enabled end-user device 110 and data center determine alternative methods or services to improve the quality and performance of the current session. For example, at step 332, the data center 120 and convergence enabled end-user device 110 may determine that path B is less congested than path A. In one embodiment, the PMAs 160 utilize GPS features and/or services to dynamically find an optimal alternative routing solution based on the end users location and the alternative transport networks available. In another embodiment, the PMAs 160 may use pre-established/configured routes dictated by the service provider among other techniques. In one embodiment, adaptations are made in terms of network routing, such as adapting via provisioning and/or reprovisioning one or more portions of the relevant path(s) supporting the service. Other network management or routing parameters may also be adapted.

It is noted that each performance/quality metric has an associated threshold value that is predefined to provide demarcation between satisfactory or unsatisfactory operating conditions. Further, the performance/quality metrics may have tiered threshold values to signify a hierarchy of performance or quality conditions. The real-time measured values are either directly compared to the appropriate threshold values, or are used to compute one or more measured values for comparison purposes.

At step 334, one or more optimal methods or services is selected by the convergence enabled end-user device 110 and data center 120. Following the current example above, if both the data center 120 and convergence enabled end-user device 110 agree that switching over from path A to path B is an optimal solution to the congestion problem found on path A, then at step 334, the data center 120 and convergence enabled end-user device 110 update the user's service/application context profile to acknowledge the agreed upon solution for the illustrative congestion problem (i.e., the solution to the degraded condition).

At step 336, a switch-over to the selected optimal solution is performed, without interrupting the session in progress. For example, data traffic is switched from path A to path B in the core network 102. The switchover is initiated by the data center 120, which among other functions, is able to regulate traffic patterns in the network 100. At step 338, the end-user is able to continue using their convergence enabled end-user device 110 with minimal disruption due to the degradation in the network. Further, from the perspective of the end-user, the switchover is provided in a seamless manner. The method 300 then proceeds to steps 206 to 210, where real-time measurements are taken after the switchover occurred, and the convergence enabled end-user device 110 and NOC 130 are updated with the status of the network 100, as described above.

The first embodiment of the present invention described with respect to FIGS. 1-3 provide monitoring of performance and quality metrics associated with various network elements (e.g., nodes and links) in the network 100. Further, the performance monitoring agents 160, which are loaded at various nodes in the network, communicate with each other to determine an optimal service solution based on currently measured performance/quality metrics. One or more optimal solutions may then be automatically implemented by the data center 120, such that the convergence enabled end-user device 110 may continue with the current session, without having to initiate a new session. Thus, the first embodiment of the present invention optimizes network conditions for a current user session based on current (i.e., present) network conditions.

For example, an end-user of a cellular convergence enabled end-user device 110 may be roaming between the near base station $140_1$ and the distant base station $140_2$. During the course of the session, the data center 120 may sense network degradation from the real-time measurements being computed by the PMA 160, as discussed above with respect to steps 320 and 322 of FIG. 3. After resolving optimal solutions for the degraded network condition, in one embodiment, an optimal solution may be to switchover to a wireless LAN 104 (if available) instead of continuing the session with the distant base station $140_2$. The optimal solutions may include one or more changes in the communications path between the mobile node 110 and various nodes in the network 100. Other circumstances may include, but are not limited to node failures, link failures, unsecured access paths, expensive access paths, among other network conditions.

Figure 4:
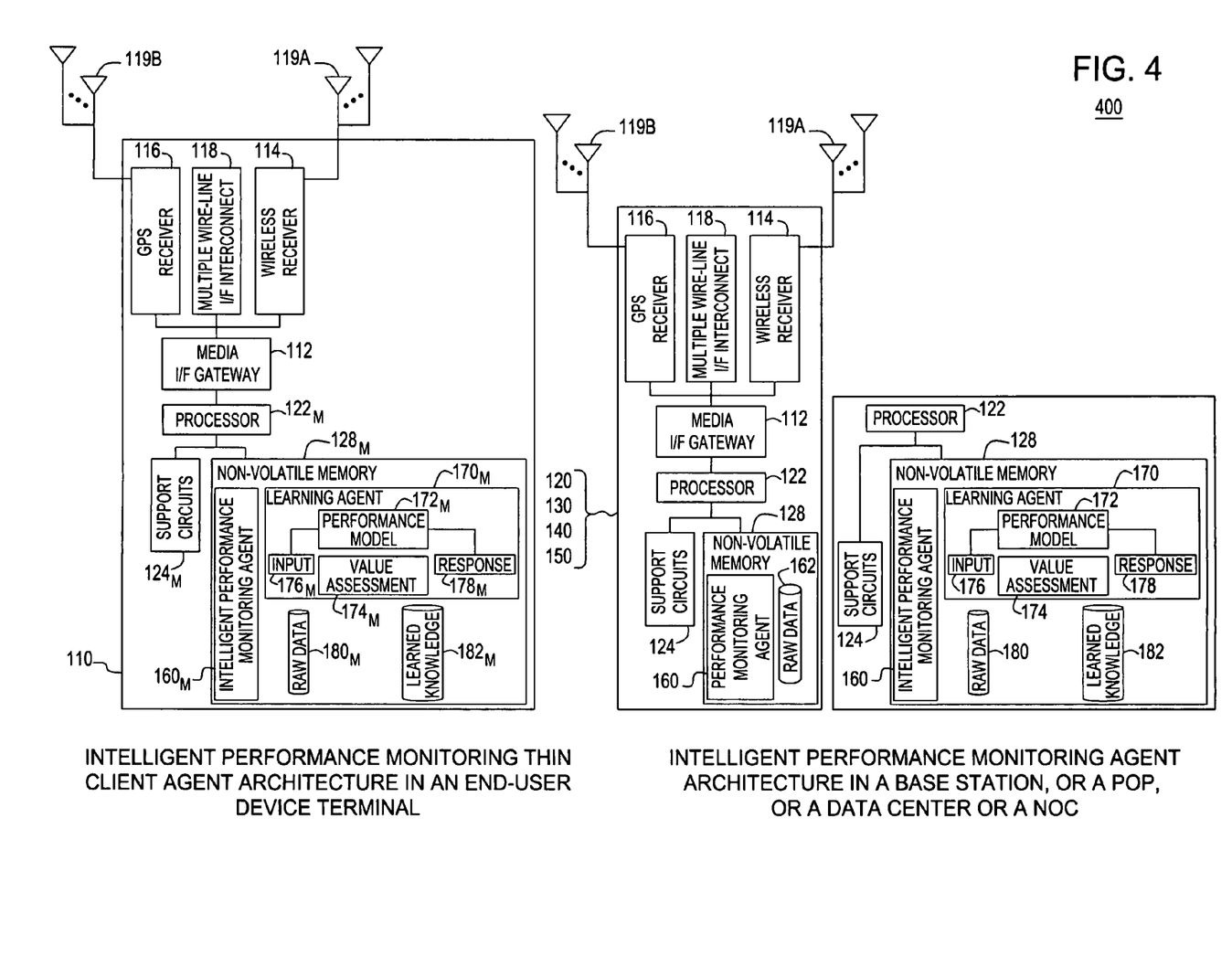
FIG. 4 depicts a high-level block diagram of a second embodiment of the convergence enabled end-user devices with intelligent performance monitoring agent of the present invention suitable for use in the exemplary network of FIG. 1.

FIG. 4 depicts a high-level block diagram of a second embodiment of the performance monitoring agent 160 of the present invention suitable for use in the exemplary network of FIG. 1. In contrast to the first embodiment discussed with respect to FIGS. 1-3, this second embodiment of the present invention optimizes network conditions for a current user session based on both current (i.e., present) network conditions, as well as knowledge from previous network conditions. That is, in the second embodiment, previous network conditions across the network are stored and processed to generate knowledge, such that the PMA 160 utilizes this knowledge to provide optimal solutions for poor quality/performance conditions.

Referring to FIG. 4, the convergence enabled end-user device 110 is the same as illustratively shown in FIG. 1, except that an intelligent (i.e., learning) agent 170 including a raw data database 180 and learned knowledgebase 182 is also stored in the memory 128. In particular, the learning agent 170 comprises an input module 176 having at least one input buffer (not shown), a performance model module 172, a value assessment module 174, and a response module 178 having at least one output buffer (not shown).

The performance model module 172 includes a plurality of performance models (e.g., threshold values) and algorithms associated with the network 100 for providing ideal or at least satisfactory performance and quality conditions across the nodes and links in the network 100. The performance models depend on the network node considered. For example, the performance model of a convergence enabled end user device is based on the capabilities of the end user device and is built on the services supported by the end user device. So, the PDA performance model will look different from the performance model of the laptops. Other performance models may include, but are not limited to access technology based performance models, content based performance models, transport network based performance models, data center performance models, billing performance models, security based performance models, and the like among other performance models.

The raw data includes currently measured data, such as packet time stamp information, signal power levels (e.g., dB), power levels, delay metrics, jitter, throughput metrics, applications accessed, network element and link utilization, network element and service reliability, routing costs, routing path taken, among other information. The input module 176 collects (buffers) raw data from the raw data database 180 for use by the value assessment module 174 and the performance models 172. The value assessment module 174 evaluates such raw data against the performance models and appropriate threshold values. The response module 178 buffers the new knowledge generated by performance model 172 and the value assessment module 174 and stores the data from into the learned knowledge database 182. In one embodiment, the data stored in the knowledge database 182 includes statistical distributions like end user device load (e.g., packet traffic) during particular times of a day/month/year, previous session information associated with a particular user and/or other users at various access networks 104 or with various base stations 140, scheduled maintenance associated with various network elements, failure assessment of the network nodes and links, distributions of traffic on different access nodes, transport nodes, servers, and the like among other learned metrics with respect to previous user sessions and network conditions. The received data in the response module 178 is then made available to the PMA 160 to determine optimal solutions for various degraded network conditions, as discussed above with respect to FIGS. 1-3.

Similarly, each of the base stations 140, wireline POPs 150, data centers 120, NOC 130, among other network nodes include a learning agent 170. As shown in FIG. 4, in one embodiment, the learning agent 170 may be installed on a server 190 and apart from where the PMA 160 is installed. In one embodiment, the server 190 including a learning agent 170 is a centralized server suitable for use with a plurality of network elements. In yet another embodiment (not shown), the learning agent 170 may be installed locally along with the PMA 160 at each network element (e.g., node). In any of the embodiments, the learning agents 170 and PMAs 160 interact in a similar manner across the network 100.

Figure 5:
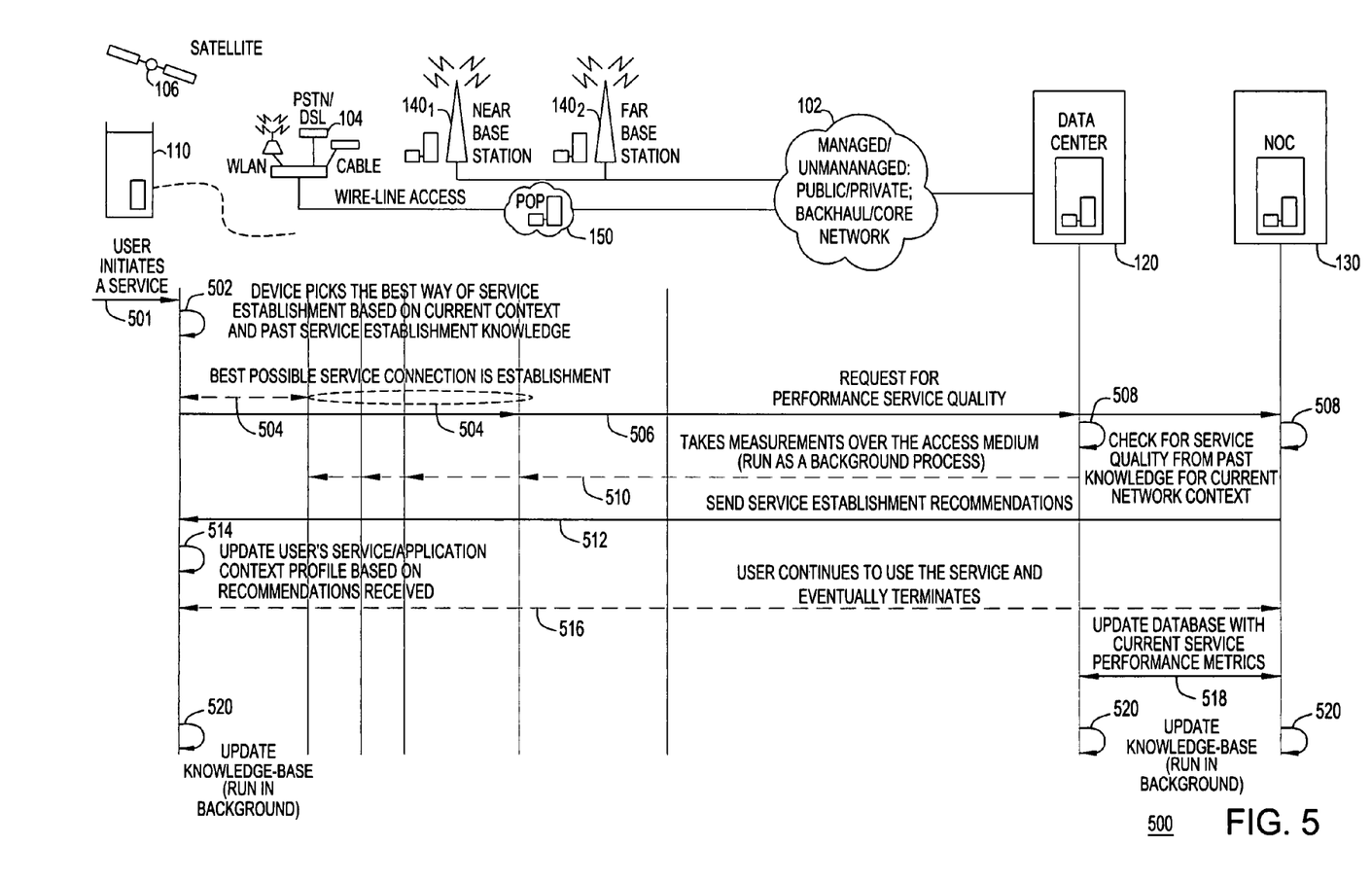
FIG. 5 depicts a flow diagram of a third method for monitoring network conditions suitable for use in the exemplary network of FIG. 1.

FIG. 5 depicts a flow diagram of a third method 500 for monitoring network conditions suitable for use in the exemplary network 100 of FIG. 1. The third method 500 utilizes currently measured information as discussed above with respect to FIGS. 2 and 3, as well as previously learned information using the PMAs 160 and learning agents 172 discussed above with respect to FIG. 4.

The method 500 starts at step 501, where the user of the convergence enabled end-user device 110 initiates a service to receive/send information. For example, the service may be to place a cellular phone call to another individual, a request for content (e.g., multimedia content and/or data) from a content provider, a VoIP service, among other services available over the resource network 102.

At step 502, the PMA $160_M$ operates in conjunction with the associated learning agent $170_M$ of the convergence enabled end-user device 110 to select optimal network conditions to establish the service session, based on current context and previous service establishment knowledge stored in the knowledge database $182_M$. Regarding the current context, the PMA $160_M$ checks current network conditions, such as whether a carrier is out of range or unavailable, power levels, bandwidth available, capabilities of the convergence enabled end-user device, among other network conditions. Regarding previously established sessions, the PMA $160_M$ utilizes the learning agent $170_M$ to determine which quality/performance levels associated with particular paths, nodes, links, and other network elements during previous sessions. Depending on temporal information (e.g., day and time) associated with previous sessions, the PMA $160_M$ will select an optimal service connection to the network 100 based on such past performance or history. The learning agent $170_M$ determines which paths (i.e., routes) will provide high quality service at a particular time, and the PMA $160_M$ will select an optimal path, based on least cost factors for the end-user, as well as administering the network.

For example, a user may wish to make a long distance telephone call using the convergence enabled end-user device 110 at a historically heavily congested time (e.g., a national holiday at 8:00 pm). The learning agent $170_M$ and PMA $160_M$ will select an optimal service connection (e.g., wireline access, if available) to the network 100 based on such past performance or history.

At step 504, the selected optimal service connection is established between the convergence enabled end-user device 110 and either the wireline access network 104 or a base station 140, based on the determination made by the convergence enabled end-user device 110 at step 502. As shown in FIG. 5, the small dashed line and the large dashed (elliptical) line at step 504 represents connectivity to either the wireline access network 104, or with the base station $140_1$. If the quality level is satisfactory (e.g., equal to or surpasses particular quality related thresholds), then, for example, the service connection will be made with either the base station 140 or a wireline access network (if available) based on cost effectiveness. Accordingly, steps 201-202 of FIG. 2 differ from steps 501-504 of FIG. 5, since the user selects the type of service and access medium in method 200, while the convergence enabled end-user device 110 selects the appropriate service access medium in method 500 based on optimal conditions from prior history.

At step 506, the user device 110 sends requests to the various nodes (e.g., base station 140, wireline access network 104, data center 120, and NOC 130) to perform performance/service quality measurements. The request is made for all the network elements having at least a PMA 160 along the selected communications path.

At step 508, the data center 120 and/or NOC 130 initiates a service quality check for the current user session. In particular, previous service quality/performance levels are identified from the learned knowledge database 182. That is, the data center 120 and/or NOC 130 determine what the network conditions were in terms of performance metrics during previously occurring sessions for this user. Further, at step 510, the data center 120 and/or NOC 130 perform measurements over the session access medium an update their respective current network context databases.

At step 512, the exemplary data center 120 and NOC 130 utilize the past and current measured information to provide optimal quality service recommendations, if any to initiate the current session. As discussed above with respect to FIG. 4, the learning agent 170 assesses the learned knowledge and current network metrics, compares them to their respective performance models/thresholds, and selects an optimal service recommendations based on the measured quality/performance metrics and cost factors. In instances where recommendations are determined, the data center 120 sends the service recommendations to the convergence enabled end-user device 110 across the presently used access medium (i.e., path between the convergence enabled end-user device 110 and the data center 120).

At step 514, the convergence enabled end-user device 110 updates the service/application context profile based on the recommendations received. Accordingly, the user is notified that these recommendations have been made to improve the service quality of the current on going session. Once the recommendations have been received to improve the service quality, the recommendations are instituted to run the session. At step 516, the user continues to use the now established service (i.e., session) until the user decides to terminate the present session.

At step 518, the data center 120 and NOC 130 update the raw data databases 180 with current service performance metrics, and at step 520, the convergence enabled end-user device 110, data center 120, and NOC 130 update their respective knowledge databases 182. Thus, the measured metrics from the user's current session are synthesized by the learning agents 170 at each network element to update the learned knowledge databases 182. For example, if the service quality was satisfactory during the session, then the learning agents 170 update their learned databases 182 to store information, such as the session time, user, session access medium (i.e., path), and other session parameters associated with the user's session.

Furthermore, the data center 120 and NOC 130 also update their knowledge databases with network conditions unassociated with the user, but occurring contemporaneously with the user's session. For example, failures or scheduled maintenance may have occurred at other nodes or links in the network that may potentially impact the user during future session on a particular day or time.

Thus, the method 500 of FIG. 5 provides for establishing a service based on previous and current network conditions. That is, various network elements are selected for a user's session for a particular service initially by the convergence enabled end-user device 110. Furthermore, the data center 120 provides real-time monitoring (i.e., real-time measurements) of current session metrics, and subsequently may make recommendation during the present session to perform a switchover to improve the service quality for such session. The recommendations are based on previously measured and currently measured network conditions.

Figure 6:
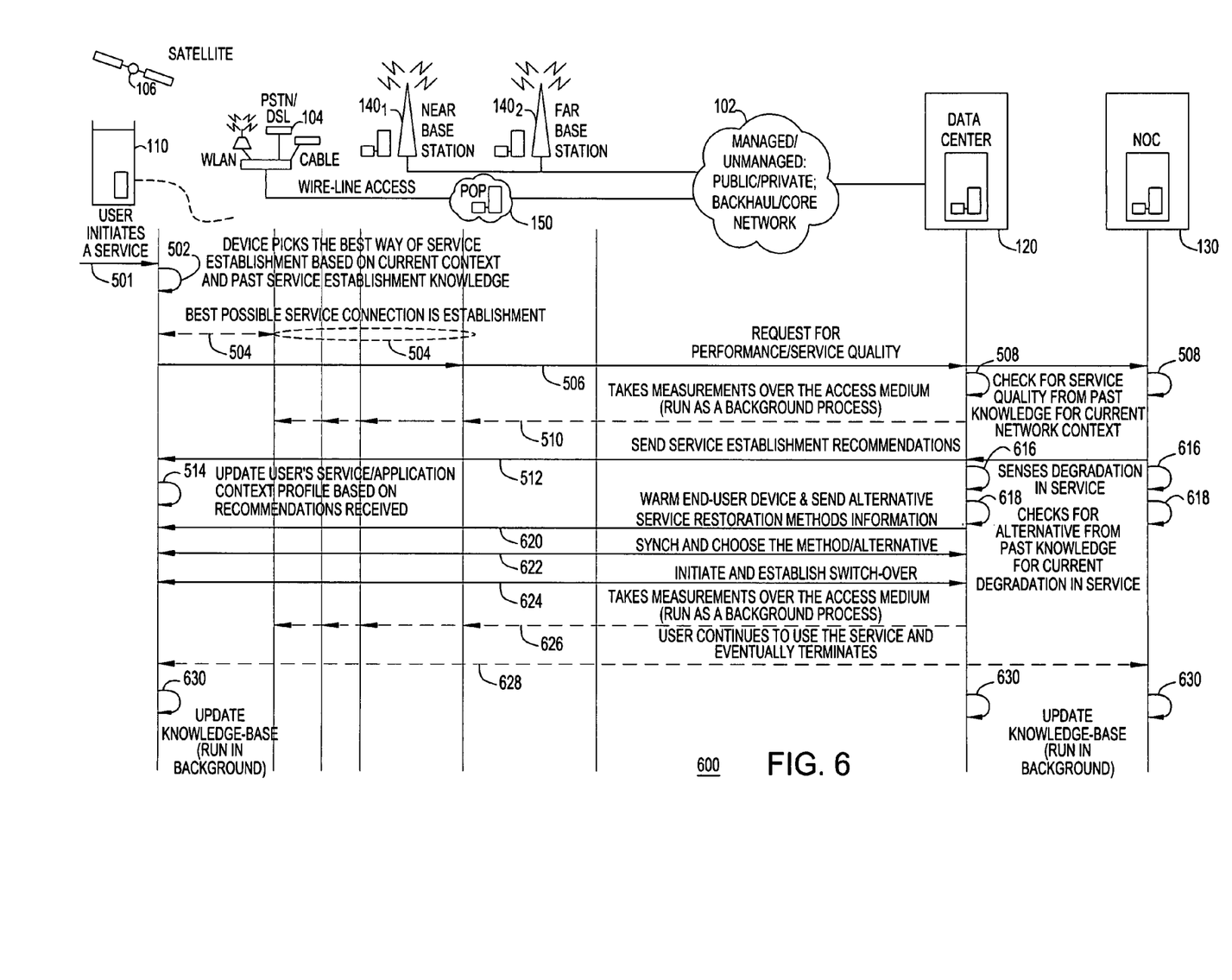
FIG. 6 depicts a flow diagram of a fourth method for monitoring network conditions suitable for use in the exemplary network of FIG. 1.

FIG. 6 depicts a flow diagram of a fourth method 600 for monitoring network conditions suitable for use in the exemplary network 100 of FIG. 1. FIG. 6 is the same as FIG. 5, except for differences noted herein. In particular, FIG. 6 starts at step 501 and proceeds to step 514, as discussed above with respect to method 500 of FIG. 5. The method 600 then proceeds to step 616.

At step 616, the data center 120 and/or NOC 130 senses degradation in service. The data center 120 receives updated information from the various network elements, such as performance metrics, alarms, among other network information, as discussed above. That is, the learning agent 170 at the data center 120 determines that one or more network parameters (e.g., BER, S/N ratio, among others) across the network 100 for the current session are below some acceptable threshold values. Upon detecting degradation in service that falls below a certain threshold, the data center 120 and/or NOC 130 will attempt to improve the service quality for the user. At step 618, the learning agent 170 of the data center 120 and/or NOC 130 searches for possible solutions to improve the service quality for establishing the user's current session.

In one embodiment, for example, an alternative path through the core network 102 may be determined as an optimal solution in an instance where the current path is now congested. Alternatively, in another embodiment, a network node failure, a down network link, an expensive route, an overloaded server, end user closer to a better access medium could initiate a search for an optimal service for end user.

At step 620, the data center 120 sends at least one message to the convergence enabled end-user device 110 to warn the user of the degradation in the network 100 during the current session. As noted above, the warning may produce a visual or audible indicator on the convergence enabled end-user device 110. Further, an alternative (recommended) optimal solution to improve service quality during the session is also sent to the convergence enabled end-user device 110.

At step 622, the convergence enabled end-user device and data center 120 synchronize on the proposed solution to overcome the session degradation. Specifically, the convergence enabled end-user device and data center must agree on a solution. If the convergence enabled end-user device 110 does not agree with the proposed solution, then a message is sent back to the data center declining the proposed solution. In one embodiment, the convergence enabled end-user device sends a rejection message, and the data center then sends an alternative optimal solution. In another embodiment, the convergence enabled end-user device 110 sends a new proposed solution, which the data center 120 can either accept or reject. In either of the embodiments, the convergence enabled end-user device 110 and data center 120 must agree on a proposed solution to overcome the detected service deficiency in the network 100.

At step 624, a switchover to the agreed upon proposed solution is initiated and established. The initiation and establishment of the proposed solution occurs at the network elements involved in the previous path (access medium) and the new path. Once a new path is established, at step 626, the data center 120 obtains measurements over the new access medium for the session. In one embodiment, the measurements are taken during background process of the current session. At step 628, the current session along the alternative path continues until the user terminates the session. At step 630, the network elements, such as the convergence enabled end-user device 110, data center 120, and NOC 130 update their respective knowledge databases 182, as discussed above with respect to FIGS. 4 and 5.

It is noted that the PMAs 160 and learning agents 170 periodically monitor network conditions during the course of a session by taking measurements in the background of the session activity, and such background measurements are transparent to the end user. Accordingly, the present embodiment described in FIGS. 4-6 enable a convergence enabled end-user device to determine an optimal path to initiate a session, based on past session and network history, as well as current session and network conditions as determined by real-time measurements. Moreover, the network elements are able to detect and respond to specified service degradation, based on predefined thresholds and performance models, to improve the service quality during the present session.

From the perspective of the end-user, the end-user will always receive the best available service quality, thereby reducing annoying service issues, such as dropped calls, delays in receiving information, weak signal strength, loss of information, increased costs for utilizing the service, and the like. From the perspective of the service provider, the service provider is able to manage the network and provide bandwidth to its subscribers based on their needs, without having to dedicate extra bandwidth that may not be used at certain times, which is an added expense.

Over a long period of time, the behavior of end-users, network nodes, network links, server characteristics become predictable. Thus the learning based performance monitoring agents would be most cost effective for service providers to deploy.

Although various embodiments that incorporate the teachings of the present invention have been shown and described in detail herein, those skilled in the art can readily devise many other varied embodiments that still incorporate these teachings.

What is claimed:

1. A method of improving service quality for a convergence enabled end-user device during a user session for service, comprising:

storing and updating one or more knowledge bases with network performance data;

establishing said user session between said convergence enabled end-user device and a destination node via a first group of a plurality of network elements;
measuring performance values associated with said session from real-time performance metrics received from said first group of network elements; and
adapting dynamically a network routing associated with at least one network element of said first group in response to previous network conditions stored in the one or more knowledge bases and said real-time measured performance values indicating degraded service quality for said session.

2. The method of claim 1, wherein said improving service quality comprises selecting improved quality portions of said network to support said user session for service.

3. The method of claim 1, wherein said measured performance values comprise performance values of network components supporting said user session.

4. The method of claim 1, wherein said measuring performance values comprises monitoring performance metrics of said plurality of network components during said session.

5. The method of claim 1, wherein said establishing said user session comprises receiving a session initiation request for a particular access network from a user of said convergence enabled end-user device.

6. The method of claim 1, wherein said measuring performance values comprises determining at least one of Bit Error Rate (BER), signal-to-noise (S/N) ratio, power level, path congestion, latencies, network element utilization, network link utilization, jitter, network element reliability, service reliability, routing path taken and routing path cost.

7. The method of claim 1, wherein said measuring performance values comprises time stamping packets passing though said first group of network elements.

8. The method of claim 1, wherein said step of measuring performance values comprises:
computing said performance values from said performance metrics; and
determining whether at least one of said measured performance values exceeds at least one associated threshold.

9. The method of claim 1, wherein said step of adapting comprises switching from using at least one of said first group of network elements to at least one other group of networks element during said session.

10. The method of claim 1, wherein said establishing user session comprises:
determining, by said convergence enabled end-user device, an optimal access medium to establish said session.

11. The method of claim 1, wherein said establishing said user session is performed using past session history of said first group of network elements.

12. The method of claim 11, wherein said past session history of said first group of network elements is used to adapt said establishing said user session.

13. The method of claim 11, wherein said past session history is used to update a knowledge base associated with said first group of network elements.

14. The method of claim 1, wherein said establishing said user session comprises using prior session history information to adapt the session being initiated to current network conditions.

15. The method of claim 1, wherein said establishing said user session comprises predicting an optimal service alternative to establish said session for services based on past and current network conditions.

16. The method of claim 1, wherein said measuring performance values comprises collecting said performance metrics at each network element and said convergence enabled end-user device.

17. The method of claim 1, wherein said measuring performance values comprises collecting said performance metrics at a centralized network element and said convergence enabled end-user device.

18. The method of claim 1, wherein said step of adapting comprises switching from using at least one of said first group of network elements to at least one other network element during said session based on knowledge obtained from past performance of said network.

19. The method of claim 1, wherein said adapting comprises switching from using at least one of said first group of network elements to at least one other network element during said session by predicting optimal network elements based on past performance and current conditions of said network.

20. The method of claim 1, further comprising:
notifying an end user of at least one network condition via at least one of a visual and audio indicator.

21. A method, comprising:
storing and updating one or more knowledge bases with network performance data;
measuring performance values associated with a user session between a convergence enabled end-user device and a destination node, said session supported by a first plurality of network elements; and
adapting dynamically a network routing associated with at least one of said first plurality of network elements in response to previous network conditions stored in the one or more knowledge bases and said real-time measured performance values indicating a degraded service quality for said session.

22. Apparatus for improving service quality for a convergence enabled end-user device during a user session for service, comprising:
means for storing and updating one or more knowledge bases with network performance data;
means for establishing said user session between said convergence enabled end-user device and a destination node via a first group of a plurality of network elements forming a network;
means for measuring performance values associated with said session from real-time performance metrics received from said first group of network elements; and
means for provisioning at least one network element of said first group in response to previous network conditions stored in the one or more knowledge bases and said real-time measured performance values indicating degraded service quality for said session.

* * * * *